(12) United States Patent
Nishiyama

(10) Patent No.: US 6,840,356 B2
(45) Date of Patent: Jan. 11, 2005

(54) ROTARY DAMPER

(75) Inventor: Masayuki Nishiyama, Chigasaki (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/349,909

(22) Filed: Jan. 24, 2003

(65) Prior Publication Data

US 2003/0155196 A1 Aug. 21, 2003

(30) Foreign Application Priority Data

Feb. 21, 2002 (JP) ........................................ 2002-044688

(51) Int. Cl.$^7$ ................................................ F16F 9/14
(52) U.S. Cl. ........................ 188/306; 188/322.5; 16/51
(58) Field of Search ................................. 188/290–310, 188/322.5, 82.1, 130, 82.5; 4/246.2, 248; 16/51, 82, 54, 50, 221, 58; 284/177, 178; 464/24; 74/573 F, 572, 573 R, 574

(56) References Cited

U.S. PATENT DOCUMENTS

| | | | | |
|---|---|---|---|---|
| 2,027,423 A | * | 1/1936 | Gardiner | ........................ 16/84 |
| 5,381,877 A | * | 1/1995 | Kobayashi | ................... 188/290 |
| 5,530,989 A | * | 7/1996 | Remmert et al. | .............. 16/430 |
| 6,341,677 B1 | * | 1/2002 | Oliver et al. | ................ 188/307 |
| 2002/0125087 A1 | * | 9/2002 | Namiki et al. | ............... 188/290 |
| 2003/0155196 A1 | * | 8/2003 | Nishiyama | ................... 188/290 |

FOREIGN PATENT DOCUMENTS

| JP | 224543 | * 9/1989 |
|---|---|---|
| JP | 8-270703 | * 10/1996 |

\* cited by examiner

Primary Examiner—Douglas C. Butler
(74) Attorney, Agent, or Firm—Manabu Kanesaka

(57) ABSTRACT

A rotary damper includes a cylindrical member having walls on an inner peripheral surface of a cylindrical chamber along a radial line, and a rotor member having vanes moving along the inner peripheral surface of the cylindrical chamber. A resistance force of a viscous fluid filled in the cylindrical chamber is applied to the vanes when the cylindrical member rotates relative to the rotor member. The rotor member is formed of a thermoplastic resin containing inorganic filler or fiber. Thus, the rotor member having high strength can be obtained.

6 Claims, 2 Drawing Sheets

ROTARY DAMPER

BACKGROUND OF THE INVENTION AND RELATED ART STATEMENT

The invention relates to a rotary damper, more particularly, to a rotary damper for producing rotational resistance on a hinge shaft of an opening-closing member.

A rotary damper is often used for applying the rotational resistance to a hinge shaft of an opening-closing member, such as a console box and grove box in a car, a display panel of a lap-top computer and a service lid of a printer, so that the opening-closing member is not suddenly closed or opened.

As this kind of a rotary damper, a rotary damper using a viscous liquid is known. For example, Japanese Patent Publication (Tokkai) No. 64-30938 discloses a rotary damper including a cylindrical member provided with a wall along a radial line on an inner peripheral surface of a cylindrical chamber, and a rotor member provided with vanes moving along the inner peripheral surface of the cylindrical chamber, so that the vanes receive the resistance of a viscous fluid filled in the cylindrical chamber when the rotor member rotates relative to the cylindrical member.

In this type of the rotary damper, when a large damping torque is required to be generated within a limited space, the liquid must have a high viscosity. Thus, the rotary member including the vanes is required to have high torsional strength. In order to obtain the rigidity for this end, although a metal is a useful material for the rotor member, such a small part made of the metal results in a high manufacturing cost.

In view of the above disadvantages, the present invention has been made and an object of the invention is to provide a rotary damper, wherein the torsional strength of a rotor member is greatly improved without increasing a manufacturing cost.

Further objects and advantages of the invention will be apparent from the following description of the invention.

SUMMARY OF THE INVENTION

In order to attain the above objects, a rotary damper of the invention includes a cylindrical member having walls along a radial line on an inner peripheral surface of a cylindrical chamber; and a rotor member having vanes moving along the inner peripheral surface of the cylindrical chamber, so that a resistance is applied to a relative rotation between the cylindrical member and the rotor member by applying resistance of a viscous fluid filled in the cylindrical chamber to the vanes. In the rotary damper of the invention, the rotor member is formed of a thermoplastic resin containing inorganic filler or fiber. Since a flexural modulus is increased, the torsional strength of the rotor member is greatly improved.

A diameter of the cylindrical chamber may be different in two stages, so that the inner peripheral surface of a smaller diametrical portion substantially contacts an outer edge of the vane in the diametrical direction, and the inner peripheral surface of a larger diametrical portion faces the outer edge of the vane in the diametrical direction with a suitable space therebetween, thereby further increasing the resistance when the vane passes through the inner peripheral surface of the smaller diameter portion.

DETAILED DESCRIPTION OF PREFERRED EMBODIMENT

Hereunder, embodiments of the present invention will be described in detail with reference to the accompanying drawings.

Figure 1:
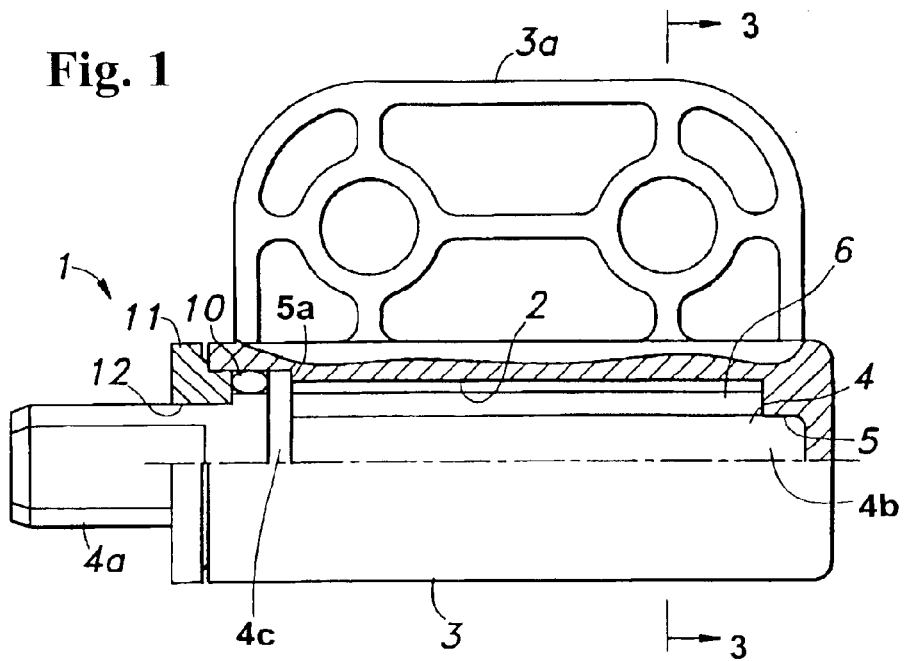
FIG. 1 is a partial sectional plan view showing a rotary damper according to the invention.
Figure 2:
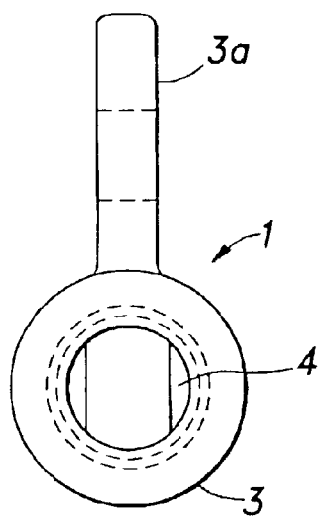
FIG. 2 is a left side view showing the rotary damper according to the invention.

FIGS. 1 and 2 show a rotary damper to which the present invention is applied. A rotary damper 1 includes a cylindrical member 3 having a cylindrical chamber 2 formed therein; and a rotor member 4 rotatably housed in the cylindrical chamber 2 and having one shaft end projecting from the cylindrical member 3. The rotary damper 1 is disposed to, for example, a hinge shaft of a service lid provided at a printer to freely open. In that case, a stay-portion 3a projecting from an outer peripheral surface of the cylindrical member 3 is fixed on a side of a main body of the printer, and one shaft end 4a of the rotor member 4 is fixed on the lid side.

The other shaft end 4b of the rotor member 4 is inserted into a central hole or depression 5 formed on a bottom wall of the cylindrical chamber 2. A pair of vanes 6 is formed on an outer peripheral surface of the rotor member 4, as shown in FIG. 3.

Figure 3:
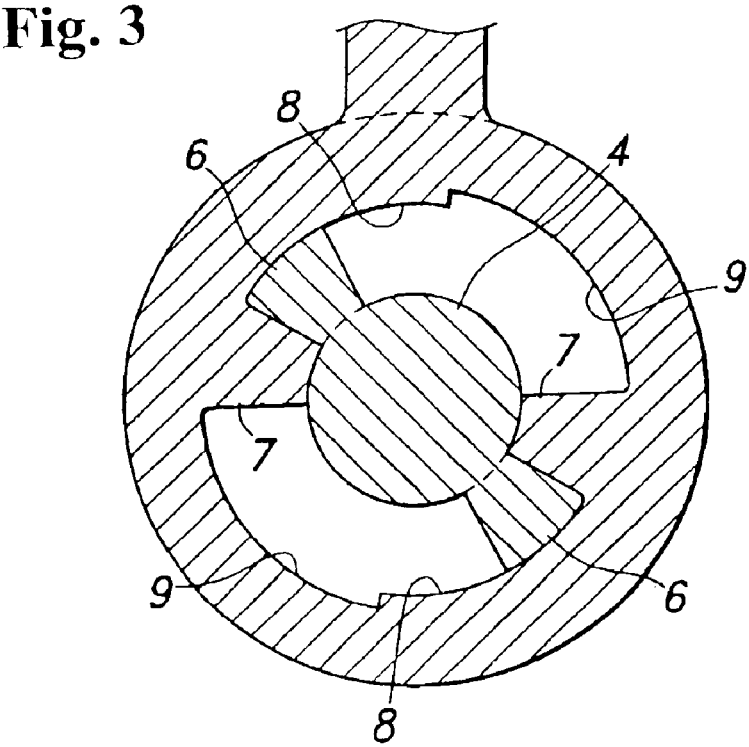
FIG. 3 is a sectional view showing an essential part taken along line 3—3 in FIG. 1.

A pair of walls 7 is formed on an inner peripheral surface of the cylindrical chamber 2 so that inner edges of the walls 7 in the radial direction contact an outer peripheral surface of the rotor member 4, as shown in FIG. 3. Also, a step portion 5a and an open end 5b are formed at a side opposite to the depression 5.

The cylindrical chamber 2 includes two portions with different diameters. Inner peripheral surfaces 8 of the smaller diameter portions substantially contact outer edges of the vanes 6 in the radial direction, and inner peripheral surfaces 9 in the larger diametrical portions face the outer edges of the vanes 6 in the radial direction with a space therebetween, as shown in FIG. 3.

Figure 4:
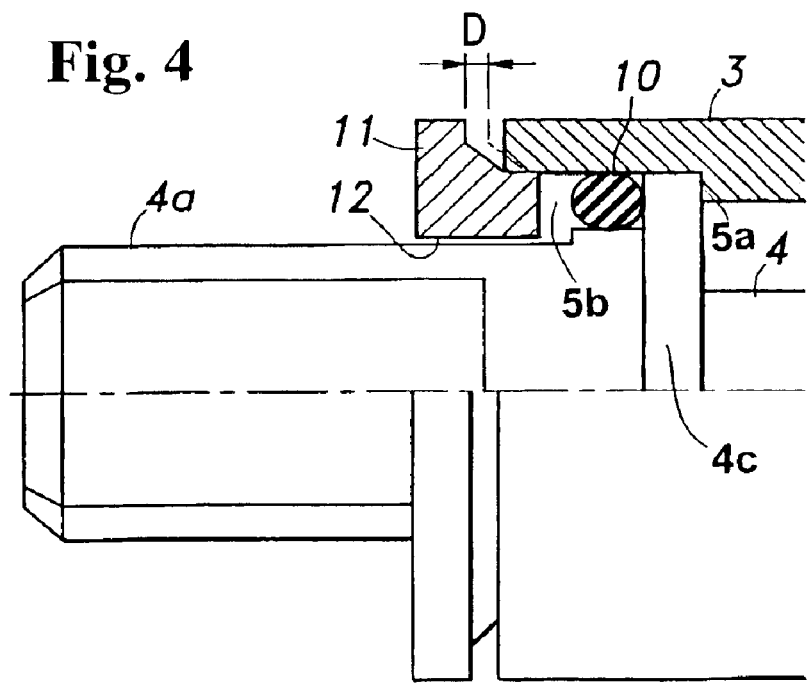
FIG. 4 is an enlarged sectional view showing an essential part of an attaching portion of a cap member.

At one shaft end 4a of the rotor member 4, a flange 4c contacts the step portion 5a, and an O-ring 10 is fitted outside the flange 4c to fluid-tightly fix the shaft end 4a, as also shown in FIG. 4. A cap member 11 through which the one shaft end 4a passes is fixed to the open end 5b of the cylindrical chamber 2 with ultrasonic welding, thereby preventing the rotor member 4 from coming off the cylindrical member 3.

A viscous fluid, such as silicon oil, is filled in the cylindrical chamber 2. In a case that a large quantity of air remains in the silicone oil, although air is effective for absorbing a thermal load, air causes fluctuation of the damping torque. According to the damper structure of the present invention, the O-ring 10 is disposed between the one shaft end of the rotor member 4 and the open end of the cylindrical chamber 2. Therefore, when the rotor member 4 is inserted into the cylindrical chamber 2, it is possible to prevent air from trapping in the silicon oil. Further, when the cap member 11 enters the cylindrical member 3 by a distance D to be fixed, as shown in FIG. 4, air escapes from a space between the central hole 12 of the cap member 11 and the one shaft end 4a of the rotor member 4, thereby almost completely-eliminating air to be mixed in the silicone oil.

According to the rotary damper 1, when the cylindrical member 3 and the rotor member 4 are relatively rotated, the flow resistance of silicon oil sealed in the cylindrical chamber 2 is applied to the vanes 6, thereby applying the damping force to the relative rotation between the cylindrical member 3 and the rotor member 4. When the vanes 6 pass through the inner peripheral surface 8 of the smaller diameter portion with the smaller space therebetween, a relatively large rotational resistance is produced. When the vanes 6 pass through the inner peripheral surface 9 of the larger diameter portion with the larger space therebetween, a relatively small rotation resistance is produced. In a case that, for example, the rotary damper 1 described above is applied to a lid opening downward and an initial resistance torque is set to be small, an opening operation force can be reduced. Also, the resistance torque is set to be large in a large opening angle area where a weight of the lid is added, so that an opening speed thereof can be reduced.

It is preferable that the cylindrical member 3 is made of polyamide with excellent chemical resistance, taking into consideration that ink of the printer may stick to the cylindrical member 3. Especially, the durability of the cylindrical member 3 can be further improved by reinforcing with glass fiber, carbon fiber, or potassium titanate.

A material for the rotor member 4 includes such a thermoplastic resin as polyacetals, polyamides, polybutylene terephthalate, polyphenylene sulfide, polyphenylene oxide, polyphenylene ether, polyethylene terephthalate, polypropylene, polycarbonate, and acrylonitrile-butadiene-(ethylene)-styrene copolymers (ABS). Especially, in order to obtain a high torsional strength, it is preferable to form the rotor member 4 of polyacetals with talc mixing therein as inorganic filler to increase a flexural modulus. It is useful to mix glass fiber, carbon fiber or potassium titanate therein for increasing the overall strength. Incidentally, when a mixing ratio of the inorganic filler or fiber exceeds 45 wt %, the surface smoothness is deteriorated. Especially, in the case that the O-ring is disposed, the sliding ability thereof is reduced. Therefore, it is preferable that a mixing ratio of the inorganic filler or fiber does not exceed 45 wt %.

As described above, according to the present invention, since the torsional strength of the rotor member can be improved, it is possible to achieve a higher rotation resistance torque. Therefore, the present invention can expand an application area of the rotary damper without increasing a production cost.

While the invention has been explained with reference to the specific embodiment of the invention, the explanation is illustrative and the invention is limited only by the appended claims.

What is claimed is:
1. A rotary damper comprising:
a cylindrical member having a cylindrical chamber, and a wall formed on an inner surface thereof and extending along a radial direction of the cylindrical member, said cylindrical chamber including a first portion, and a second portion extending from the first portion along the radial direction and having an inner diameter greater than that of the first portion, said cylindrical member having a central depression at one end, an opening at a side opposite to the central depression, and a step portion near the opening,
a rotor member inserted in the cylindrical member and having a vane moving along the inner surface of the cylindrical chamber, said rotor member being formed of a thermoplastic resin containing at least one of inorganic filler and fiber, said vane having an outer edge substantially contacting an inner surface of the first portion in the radial direction and facing an inner surface of the second portion in the radial direction with a space therebetween, said rotor member having a first end rotationally fitted in the central depression, a second end formed at a side opposite to the first end to be located outside the cylindrical member and a flange between the first and the second ends and fitted to the step portion, and
a viscous fluid filled in the cylindrical chamber so that a resistance force of the viscous fluid is applied to the vane of the rotor member when the rotor member rotates relative to the cylindrical member.

2. A rotary damper according to claim 1, wherein said thermoplastic resin contains less than 45 wt % of at least one of the inorganic filler and the fiber.

3. A rotary damper according to claim 1, wherein said inorganic filler is talc.

4. A rotary damper according to claim 1, wherein said fiber is at least one member selected from the group consisting of carbon fiber, glass fiber and potassium titanate.

5. A rotary damper according to claim 1, wherein said thermoplastic resin is at least one resin selected from the group consisting of polyacetal, polyamide, polybutylene terephthalate, polyphenylene sulfide, polyphenylene oxide, polyphenylene ether, polyethylene terephthalate, polypropylene, polycarbonate, and acrylonitrile-butadiene-styrene copolymer.

6. A rotary damper according to claim 1, further includes an O-ring disposed outside the flange, and a cap located outside the O-ring for closing the opening of the cylindrical member.

* * * * *